Patented June 20, 1950

2,512,504

UNITED STATES PATENT OFFICE 2,512,504

STABILIZATION OF XYLIDENE

Dilworth T. Rogers, Summit, N. J., assignor to Standard Oil Development Company, a corporation of Delaware No Drawing. Application December 17, 1947, Serial No. 792,323

2 Claims. (Cl. 260—578)

This invention relates to the treatment of aromatic amines to stabilize such amines against discoloration or degradation due to inherent instability of the amines as ordinarily prepared. In particular, the invention comprises the treatment of aromatic amines with metal halides and alkali whereby the amines are stabilized toward heat, light and oxidation.

Aromatic amines are employed for a variety of purposes. Their use has become wide spread as a blending agent in gasoline, particularly in aviation gasoline. The effect of an aromatic amine when added to a gasoline is to improve the antiknock quality of the gasoline. Consequently, the quality of a given gasoline may be improved or poorer quality gasolines may be made to reach critical specifications, thus, serving to increase both the quantity and quality of high anti-knock gasoline. It has been reported, for example, that aviation fuels containing aromatic amines have been improved by 20% in power output when operated at rich mixture conditions. Of the amines employed for this purpose typical amines are aniline, xylidines, and other homologs of aniline. In view of certain disadvantages of some of the above mentioned amines, for example, the poor solubility of aniline in hydrocarbon mixtures, interest has primarily been centered on the use of xylidine in aviation gasoline. Consequently, this specification will be directed particularly to the stabilization of xylidine while being broadly applicable to any aromatic amine. It is further to be noted that stabilization of amines is also of value in other fields, for example in the preparation of dye stuffs.

As stated, aromatic amines generally have poor stability. It is believed that the instability of aromatic amines is due to the oxidation of impurities in the amines with a resultant change in color and deposition of gum; it is thought the impurities comprise unstable diamines. While this degradation occurs under normal storage conditions over a period of time, in general, degradation is accelerated by exposure to high temperature, by exposure to light, and by exposure to metallic containers.

The change in color of an aromatic amine due to degradation is serious from a psychological or consumer viewpoint and is serious because color degradation may lead to the confusion of gasoline stores. Also, the gum formation which occurs in degradation is sufficient to materially decrease the quality of a particular gasoline.

It is, therefore, a particular object of this invention to effectively stabilize aromatic amines so as to minimize the degradation they undergo as a result of prolonged storage or exposure to heat or light.

It is well known that the stability of amines may be improved by incorporating certain inhibitors with the amines. While this expedient is suitable for many purposes the stability achieved is not all that might be desired. It is, therefore, a further object of this invention that aromatic amines be so processed that it is not necessary to employ an inhibitor.

In accordance with the present invention aromatic amines are treated with metal halides. Metal halides which may be employed are ferric chloride, vanadic chloride, cobaltic chloride, nickelic chloride, chromic chloride or bromides and higher chlorides or bromides of other multivalent metals. Either the hydrated or the anhydrous halides may be used. The halide treated amine is then preferably treated with an alkali and distilled to recover the stabilized amine overhead. The aromatic amine to be treated is mixed with a small percentage of the metal halide which may broadly be from about 0.1 to 5.0% by weight; preferably about 1.0% of the metal halide is used. The treating operation may be carried out at room temperatures although higher temperatures may be employed. The temperature range may be 15° C. to 150° C. The time of contact is not critical so long as good mixing of the metal halide with the aromatic amine is achieved. A suitable time is in the range of 0.1 to 5 hours. The treatment with the metal halide may be carried out by adding the metal halide directly to the amine or by adding the metal halide in hydrochloric or acetic acid solution. An alkali may be added directly after the metal halide is added. Sufficient alkali is preferably employed to neutralize acidic constituents present. After treatment, the aromatic amine may be decolorized by clay treatment or preferably may be distilled to yield the final product.

It is desirable in the practice of my invention, although not required, that after the treatment of the aromatic amine with the metal halide that the amine be treated with hydrogen sulfide gas. This may be accomplished by bubbling or diffusing the hydrogen sulfide into the aromatic amine. When this procedure is followed it is desirable to wash the aromatic amine after hydrogen sulfide treatment with an alkali.

Another procedure which may be employed is to follow the treatment of the aromatic amine with a metal halide by washing the aromatic amine with alkali directly without employing hydrogen sulfide.

In order to test the efficacy of my process the color stability of aromatic amines were tested at elevated temperatures. The xylidine was stored in open 16 m. m. Pyrex test tubes in an oven held at 194° F. Periodically the degree of transmission of light through the sample was determined photo-electrically. Transmission values were determined using a Hellige-Diller Model 400 Spectrophotometer with a North Sky filter. The time required for the aromatic amine to degrade to 10% transmission of light was used as a measure of color stability in these tests. The value of 10% transmission was arbitrarily chosen since lower transmission values could not be determined very accurately and since a degradation below about 10% is so severe as to have a deleterious effect on the color of gasoline with which the amine may be blended.

As an example of my invention a xylidine was employed which after distillation at atmospheric pressure in an atmosphere of carbon dioxide and with no inhibitor degraded in 12 to 13 hours to a transmission value of 10%. On treating this xylidine with 2 weight percent of hydrated ferric chloride for one and one-half hours at 100° C. followed by filtration and vacuum distillation 14 hours were required to degrade the xylidine to a transmission value of 10%.

As a further example of my invention the same sample of xylidine was treated with 1% by weight of hydrated ferric chloride for one and one-half hours at 100° C. 50% solid sodium hydroxide was added and the aromatic amine was vacuum distilled. 40 hours were required to degrade the 5 to 50% distillation cut to a transmission value of 10% while 29 hours were required to similarly degrade the 50 to 95% distillation cut.

As another example of my invention the same sample of untreated xylidine was treated with 1% of hydrated ferric chloride and vacuum distilled in the presence of 10% of solid sodium hydroxide. 28 hours were required to degrade the xylidine to a 10% transmission value.

The theoretical basis of the improvement obtainable by treating an aromatic amine with a metal halide is not entirely clear. It is believed, however, that the metal halide preferentially oxidizes the unstable diamines present as impurities, thereby improving the stability of the remaining amines.

Having now described this invention, what is claimed is:

1. The process for stabilizing xylidine, in which the xylidine is mixed with 0.1% to 5.0% of a compound selected from the group consisting of ferric, vanadic, cobaltic, nickelic and chromic halides for 0.1 to 5 hours at a temperature of 15° C. to 150° C., is then treated with an alkali, and thereafter the xylidine is separated from this mixture by distillation.

2. The process defined by claim 1 in which the metal halide is ferric chloride.

DILWORTH T. ROGERS.

REFERENCES CITED

The following references are of record in the file of this patent:

UNITED STATES PATENTS

| Number | Name | Date |
| --- | --- | --- |
| 1,844,362 | Ihrig | Feb. 9, 1932 |
| 2,174,008 | Mon | Sept. 26, 1939 |
| 2,187,820 | Lecher et al. | Jan. 23, 1940 |
| 2,422,503 | Smith | June 17, 1947 |

FOREIGN PATENTS

| Number | Country | Date |
| --- | --- | --- |
| 328,418 | Great Britain | May 1, 1930 |
| 578,012 | Great Britain | June 12, 1946 |

OTHER REFERENCES

Degering, "An Outline of Organic Nitrogen Compounds," University Lithoprinters, Ypsilanti, Michigan, 1945, pp. 293–300.